A. P. BOURNE.
PNEUMATIC SPRING.
APPLICATION FILED JULY 16, 1918.

1,373,711.

Patented Apr. 5, 1921.

Inventor:
Alexander P. Bourne,
by Mitchell Chadwick & Kent
Attys.

UNITED STATES PATENT OFFICE.

ALEXANDER P. BOURNE, OF BARRINGTON, RHODE ISLAND.

PNEUMATIC SPRING.

1,373,711.   Specification of Letters Patent.   Patented Apr. 5, 1921.

Application filed July 16, 1918. Serial No. 245,230.

*To all whom it may concern:*

Be it known that I, ALEXANDER P. BOURNE, a citizen of the United States, residing at Barrington, in the county of Bristol and State of Rhode Island, have invented certain new and useful Improvements in Pneumatic Springs, of which the following is a specification.

This invention relates to improvements in pneumatic springs. More particularly it relates to springs in which an expansible chamber, preferably made of two tubes that telescope together, and by having closed outer ends contain air or other compressible fluid; although more or less of the chamber contents may be an incompressible fluid, such as oil, without altering the essentially pneumatic character of the spring. The invention relates especially to that type of apparatus in which an everted, highly flexible sleeve joins the telescoping members and constitutes a septum that prevents leakage at the joint between the tubes. Such springs may be nearly frictionless in operation. When applied to a vehicle, the gaseous fluid medium which such a spring introduces between the road and the load, practically eliminates the lesser vibrations which ordinarily are felt by passengers, makes the major vibrations less objectionable, and permits them to be reduced with less shock. The invention comprises an improvement in apparatus of this character in several respects, one of which is that it provides means by which the load carrying ability or stiffness of the spring is automatically changed when a change occurs in the load which the vehicle on an individual spring is carrying, so that the car body tends to occupy a predetermined normal elevation above the axle, with the normal range of resiliency and oscillation up and down therefrom and with normal flexibility. The invention also deals with the means by which this is accomplished, including a controlling device by which any merely temporary elevation or depression of the vehicle body such as may result from roughness in the road is ineffective to actuate the automatic apparatus while a more permanent elevation of the vehicle body, such as results from a decrease of the load carried, does have such an effect. Another feature is the device by which the two elements of the spring are centered with their axes coinciding, and are caused to oscillate in and out with a maximum of rectilinear precision and with a minimum of friction, at the same time preventing abrasion of the relatively delicate septum which holds the fluid medium. Another feature provides for reducing the amplitude of those movements which are oscillatory, as distinguished from more permanent shiftings resulting from actual change of load, and doing this gently and by the automatic action of the spring. Other features of the invention relate to the details of constructing the chamber and the septum and its connections, for tight holding and quick removability to take the spring apart or to repair it, and to the details of mounting the spring on a vehicle; and to the general problem of applying the principles of the invention in a manner that is commercially practicable as regards expense and adaptability to current practice in vehicle construction, and as regards simplicity and reliability, and in other respects developing the utility of the invention. It is also the object of the invention to provide the other advantages that are incidental to the disclosure herein made. The invention may be embodied in various forms. It is intended that the patent shall cover, by suitable expression in the appended claims, whatever features of patentable novelty exist in the invention herein disclosed.

An embodiment of the invention is illustrated in the accompanying drawings, in which—

It will be understood that in places the drawing is diagrammatic, and that any approved or suitable construction may be substituted for that indicated.

Figure 1:
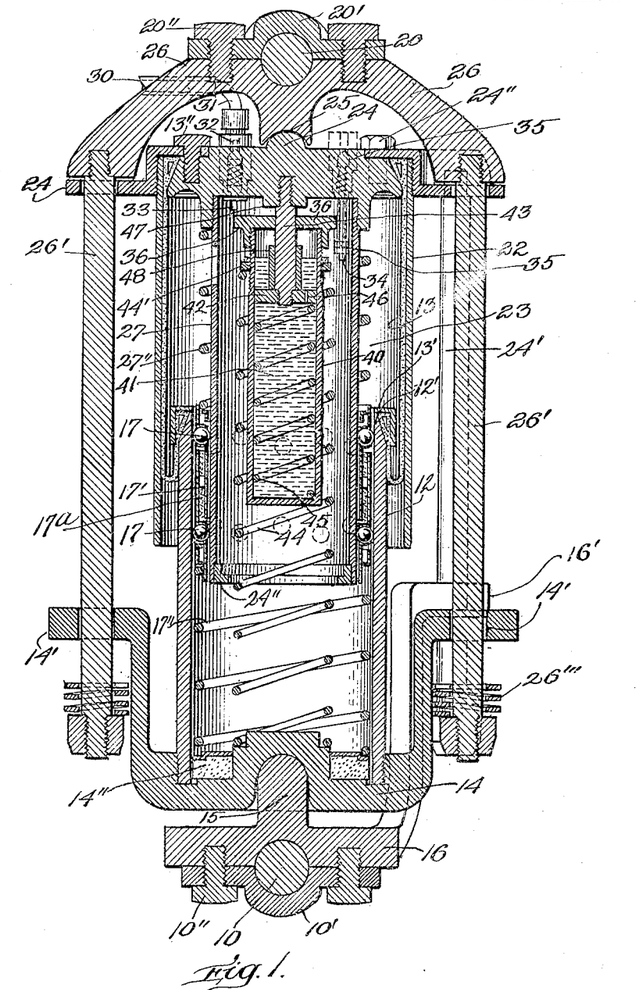
Figure 1 is an elevation in section on the line 1—1 of Fig. 2, portions being slightly out of the medial plane, and represented as if rotated into the medial plane of the device.
Figures 2, 3, 4, 5, 6:
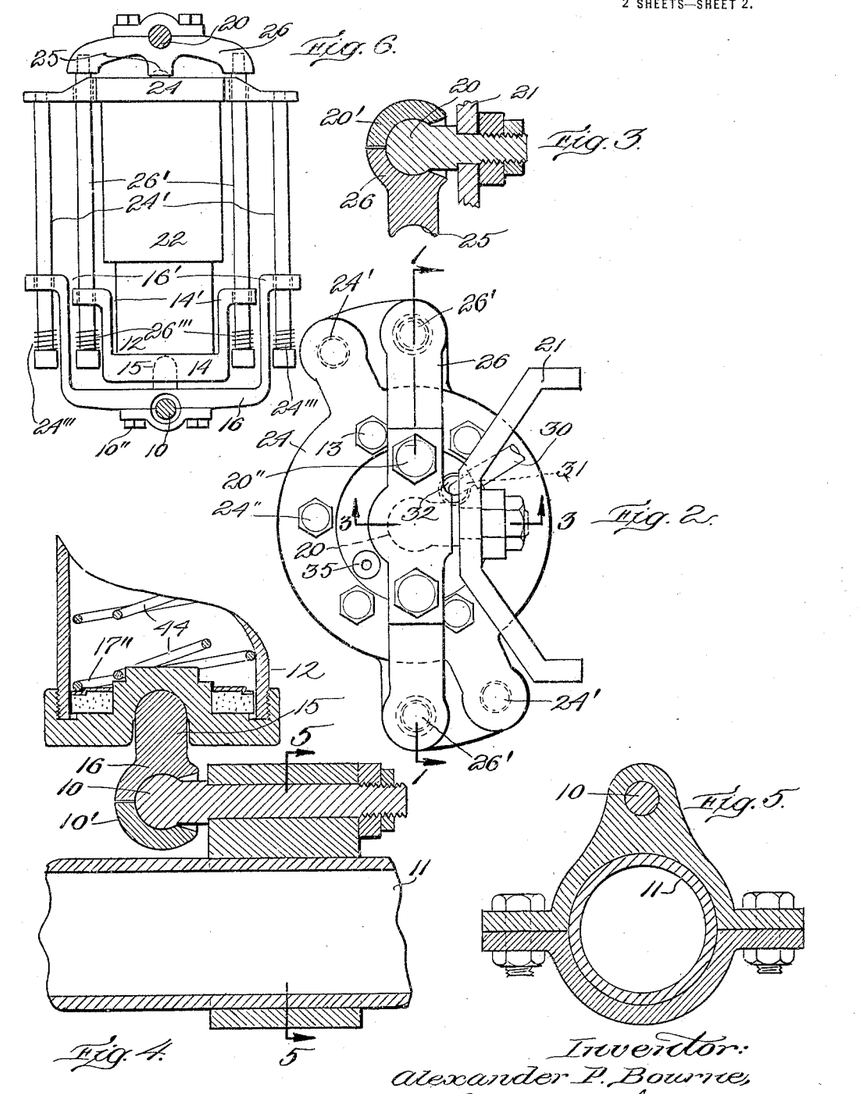
Fig. 2 is a plan.
Fig. 3 is an elevation of a detail in section on the line 3—3 of Fig. 2, showing the device which is illustrated for attaching the spring to a vehicle body.
Fig. 4 is an elevation, in section on the same plane as Fig. 3, but showing details at the other end of the spring, where it is attached to the axle.
Fig. 5 is a side elevation of a portion of the parts shown in Fig. 4, showing a detail of the attachment to the axle.
Fig. 6 is a side elevation of a modification.

Referring to the drawings, the two elements between which the spring extends are marked respectively 10 and 20 the former being illustrated as a support firmly secured on a heavy rod 11 which may be assumed to be a diagrammatic representation of a suitably strong non-rotating part of the rear axle of an automobile; and the latter being a support which, as indicated in Fig. 3, may be supposed to represent the vehicle body, frame, or other part which is supported by the spring, the same being indicated at 21, Figs. 2 and 3. The main elements of the spring are the plunger member 12 and the incasing member 22 which are adapted to telescope together, and the highly flexible sleeve septum 13 which prevents leakage of their contents. This septum, which may be made of any suitable material, has the general characteristics that it is cylindrical and open-ended. One end is adapted to fit and be fast to the outside of the plunger at its inner end, whence the septum extends outward a distance along on the external wall of the plunger to a continuously varying place, where it is everted, bridges the space between plunger and casing, and thence extends inward along the interior wall of the casing to the remote end thereof, where the other end of the septum is fastened. One feature of the invention relates to the arrangement and fastening of this septum so that it and its related parts can be cheaply manufactured, readily and securely assembled, and easily taken apart, and so that they afford a maximum of space for the installation and operation of other features of the apparatus. While variations may be made in the following respects, it will be noted that in the structure illustrated the plunger is the lower member of the pair. The casing surrounds its upper end and the septum, and projects downward far enough to protect the septum and the upper part of the plunger from dust or other matter which might lodge there, and is so arranged that gravity tends to draw away any foreign matter. The plunger 12 is a simple piece of metallic tubing whose lower end screws down into an underlying base cap 14 herein termed the base of the spring. This base is supported on a nub 15 rising from a sub-base 16 which is secured to the fundamental supporting element 10 of the spring. The engagement between the base 14 and the nub of the sub-base is merely a socket in which by its expansive tendency the spring presses the base 14 outward into engagement with the nub. The latter is set in so deeply that the parts cannot be separated, and cannot move materially sidewise while they are together, without the spring being collapsed; but when the pressure within the spring is sufficiently reduced the base may be lifted freely from the sub-base. Similarly, at the top there is a cap herein called the top of the spring 24 and a super-top 26, the top having a nub 25 which fits into a depression on the under side of the super-top 26, wherein it is held ordinarily by the expansible power of the spring, but from which it may be moved when the spring is sufficiently weakened and collapsed. Side rods 26' afford a connection, at times, between the super-top 26 and ears 14' on the base 14. Similarly, side rods 24' afford a connection at times between the top 24 and ears 16' projecting from the sub-base 16. The function and operation of these parts will be explained hereinafter. The lower end of the plunger is closed by the base 14, and the upper end of the casing is closed by the top 24. The expansible chamber 23 is between these two; and as the upper end of the plunger is open, within the casing, the chamber includes the interior space of both. The invention provides an important means for attaching one end of the septum to the open upper end of the plunger. This consists in beveling the said end as a section of a cone and having its material thick enough to make this surface long enough to support the corresponding concave section of a cone in which the inner surface of the end of the septum is made. The line referred to is in the drawing marked 12' and constitutes an air-tight closure. The septum itself may conveniently be composite, of textile fabric and rubber. A layer of the fabric may support a layer of the rubber, and should be of sufficiently fine texture to prevent the rubber from being blown through its interstices when under high pressure. This textile fabric should also be capable of such lateral expansion and contraction as will permit it to lie smoothly either on the external cylindrical surface of the plunger 12 or on the materially larger interior cylindrical surface of the casing 22. Preferably this is enough larger to permit of there being an easy bend of the septum around from one to the other. The smaller the radius of curvature of this bend the greater the pressure of contents which the apparatus can hold without rupture. The septum may be relatively thin, in order to attain high flexibility; and if high flexibility be attained, coupled with narrowness of space between the two adjacent limbs of the septum, the total pressure tending to rupture the septum, at this the only place where the fragile material is unsupported by metal, will be so inconsiderably small that the septum can endure it with safety for a long period of time,—so long in fact as the physical or chemical structure of the septum does not deteriorate. The end of this septum is prepared to be seated on the end of the plunger at the line 12' by being thickened into a triangular or wedge shaped cross section as illustrated. Having been put into place, the flanged retaining ring 13' may be dropped over it and will hold it securely. This is a simple cylindrical ring with its body portion large enough and long enough to surround the septum head, and with an inturned flange extending inward far enough to rest on the end of the plunger tube 12. Preferably its diameter may be a trifle less than the normal diameter of the plunger plus septum, so that it will compress the septum a little, especially just below its head. When the apparatus is in action, the fluid pressure within the inclosed space or chamber constituted by the casing and plunger, which inclosure or chamber is referred to by the reference numeral 23, forces the septum outward at its fold between the plunger and the casing, and tends to draw the wedge head thereof 13' closely upon the beveled end of the plunger 12 and tightly against the inside of the retaining ring 13' so that no air can pass. The joint may be made more secure against leakage by applying a sticky liquid which evaporates but little, and preferably is soluble in water so that it can be quickly washed away. An example is dark grade molasses which does not crystallize or harden on exposure, but remains sticky. Antileak liquids, common for pneumatic tires, will also provide so that no air can escape at this place.

A similarly constructed fastening for the septum is provided at its other end. In consequence the construction of this part of the apparatus is one of extreme simplicity. The plunger is a simple tube with screw at one end and bevel at the other; the retaining ring is a simple flanged ring; the septum is a cylindrical sleeve of suitable material with thickened ends, which may be vulcanized; and the casing is a simple tube with screw thread at one end. So long as the plunger moves in and out with its axis coinciding with that of the casing, the septum will roll from one metal surface to the other, practically without friction.

To guide the casing and plunger with their axes thus coinciding, a device is provided which consists of an internal plunger, fast to the casing 22 and marked 27, which is smaller than the plunger 12 and projects down into it, moving in and out as the spring contracts and expands, and centered therein by a series of rolling balls, 17, which, held in a ball carrier 17' with lubricating felt 17ª, substantially fill the distance between it and the inside of the main plunger 12, there being only such clearance as is desirable for free action. This carrier has four horizontal rows of four or more balls each, staggered so that each ball has a separate track, although for clearness in Fig. 1 upper and lower balls are shown as if they were arranged to travel in the same track. This carrier is maintained in a certain predetermined normal middle position by two springs marked respectively 17" and 27" which incase the plunger 27, the former extending from the lower edge of the ball carrier 17' to the base 14 and the latter from the upper edge of the ball carrier to the top 24. These springs, being of such strength and design that they come to a balance with the ball carrier and its balls at the middle position, and yield and expand equally as the spring collapses or expands. This provides a substantially frictionless centering device. As the rolling of a ball on the main plunger 12, is equal to its rolling on the internal plunger 27, the balls stay always in their position midway between the top and bottom caps, the springs 17" and 27" being in balance with the balls between them at this position. Hence the springs and the rolling action of the apparatus coöperate to hold the ball carrier and balls in the middle position where they will be most efficient in preventing bending of the main apparatus. As the ball carriers may extend for a considerable distance in the axial direction, this central floating brace, or bending preventive, can be made very strong and may give abundant rigidity to the telescoping members. If the compression is ever sufficiently violent, a pad 14" resting on the base 14 at the bottom of the chamber 23 receives the flange 24" on the lower end of the auxiliary plunger 27. The latter plunger, therefore, should be strong enough, and sufficiently secured to the top 24, to withstand such a stress. It does no harm if the upper and lower row of balls run off of the edges when the spring is most fully extended, for two rows of balls remain to guide the parts accurately together upon the next contraction of the spring; and also because by a device hereinafter to be explained an extreme expansion of the distance between the supertop and the sub-base, in the particular apparatus illustrated, is accompanied by and retarded by a contraction of the distance between top and base, the super-top separating from the top, and the sub-base from the base, for that purpose. As the base and the super-top become engaged together for this purpose, through rods 26', and on further spread the sub-base and the top become engaged through the rods 24', the nub is made long enough to keep the base and sub-base on the same axis during such a separation until all is held secure by the engaging of the sub-base and the top. The centering nubs 15 and 25 are made rounding to assure the centering of the spring upon the return to normal conditions. The lugs 14' and 16' and the projections of the super-top around the rods will hold the main parts of the spring approximately in place in case of deflation or accidental side pressure.

Air may be admitted to the chamber 23 through an inlet pipe 30 which as represented may be considered to be the terminal fragment of a system of flexible piping outside of the spring and leading to the spring from a reservoir (not shown) which maintains a supply of air under pressure. Such air may pass in from the pipe 30 through the pipe 31 and through a check valve indicated diagrammatically at 32, arranged so that the failure of pressure in the reservoir pipe 30 closes it; and through another having a stem 33 which projects into the chamber 23 within the internal plunger 27, arranged in position to be engaged by a device therein and pushed outward with sufficient force to overcome this pressure. These may be valves of any ordinary or suitable automatic style, preferably of the puppet valve type, set in a passage through a removable screw plug filling a hole through cap 24 as indicated. Thus the valves can be quickly examined or replaced. Air may escape from the chamber 23 through an outlet which is provided with a valve having a stem 34 which projects into the chamber within the internal plunger 27. This valve is indicated diagrammatically at 35, is similarly a puppet valve located in a removable plug, and merely discharges into the outside air. It is closed by the pressures which normally prevail within chamber 23, which are considerably above atmospheric, but is opened when a device within the chamber pulls its stem 34 with sufficient force. For that purpose its stem has a lug 35, represented as a nut with check nut. Within the internal plunger a regulating device has an annular lug 36, adapted to engage and operate either the outlet valve stem 34 or the inlet valve stem 33 when needed to restore the normal conditions for which the regulator is set. These conditions may be, for example, a requirement that the top and the base shall maintain an average distance from each other about like that portrayed in the drawing. In other words, assuming that the spring is installed under a vehicle which is at rest, the spring should automatically put its various parts into substantially the position indicated. If the spring be compressed as by the addition of a passenger, or by addition of several tons of load, the spring should presently automatically restore its parts to the same relative position, which obviously would involve the admission of a sufficient quantity of air under pressure from the supply pipe 30. Or if the load be reduced, in which case the spring would extend itself, the regulator should cause the power of the spring to be automatically reduced by opening the discharge valve 35, and holding it open until the spring has contracted to substantially the relative position of parts illustrated. The regulator must not interfere with the free play of the spring, extending and contracting to the full extent desirable in performing its function as a spring; and in consequence the momentary and repeated extensions or contractions which are constantly resulting from roughness of the road must not cause more air to be admitted or air to be discharged. The features of the invention which relate to this will now be described.

The varying positions of the lug 36 are determined by an averaging device having a retarded action. This, represented as arranged symmetrically on the main axis, consists of a closed cylindrical cup 40 adapted to contain liquid 41, such as oil or glycerin. The cup 40 is carried on a piston 42 whose piston rod 43 depends rigidly from the top cap 24. The cup is easily movable up and down along the main axis of the apparatus, as it is from time to time propelled by the preponderating influence of either the spring 44 which pushes it upward or the spring 45 which pushes it downward, subject to the retarding effect of the liquid 41 and piston 42 which has an opening 46 that makes the apparatus in the nature of a dashpot. The piston rod 43 holds the piston 42 at a fixed position with respect to said top cap. The boss 47 limits the extent to which the cup can approach the top; and a spacing sleeve 48 strung on the piston rod and resting on the piston limits the extent to which it can move away from the top cap, each limit being somewhat beyond the distance which the cup, carrying the annular lug 36, must move, either upward to open the valve 33, 32 for admitting air, or downward to open the valve 34, 35 for letting out air. If preferred, the parts 42, 43 and 48 may all be of one piece. The spring 45 is located within the lower part of the cup, extends from the piston 42, which for this purpose is the equivalent of the top cap 24, to the bottom of the cup 40, and tends always to push the cup downward, which would move its lug 36 in the direction for letting out air, and so decreasing pressure. The spring 44 which extends from the base cap 14, to an external flange 44' suitably located on the cup, tends always to push the cup and its lug 36 upward, in the direction for letting in air and so increasing the strength of the spring. The parts may be designed and set so that when the pressure of air within is right to maintain the spring as a whole distended to the desired normal degree, under whatever load it is carrying at the time and with the cup 40 then at rest, the lug 36 is between its valve engaging positions, engaging neither. This assumes that the springs 44 and 45 are balancing each other, with no tendency of the suspended cup 40 to move either upward or downward. The flange 44' is made movable and has a lock nut. By this means the normal position of the regulating cup and the normal distance between the top and the base, and the axle and the load may be varied.

The operation of this part of the apparatus will be understood by supposing that the spring is set in place in a vehicle and thus at rest, and that a load is then added. The addition of the load compresses the whole spring, bringing the top 24 and bottom 14 nearer together. This puts the springs 44, 45 out of balance, for owing to the piston and liquid the cup 40 does not immediately change its position with respect to the top 24, and so the spring 44 is compressed more than spring 45. The former therefore tends to move the cup and its lug 36 upward, to restore the balance, moving slowly as the liquid passes through the opening in the piston. When the lug 36 thus moves far enough to engage the valve stem 33, and pushes it hard enough to lift it, air begins to flow from an outside high pressure supply through the pipe 30 into the interior space 23 of the chamber. The admission of this air tends to restore the whole spring to its former degree of expansion; and the expanding movement tends to move and gradually does move the cup 40 and lug 36 downward, i. e., away from the top cap 24, because the top 24 and the bottom 14 are separating farther from each other without the springs 44, 45, expanding immediately to a corresponding extent. The delay is due, of course, to the dash-pot, but as the expansion makes spring 44 relatively and momentarily weaker than spring 45, in its effect on the cup, the cup and lug 36 begin to move away from the top cap 24 under the unbalanced influence of spring 45, and, when they have moved far enough, cease to be in contact with the valve stem 33, so that the admission of air ceases. If then a portion of the load be removed the spring as a whole tends to expand, with the result that the top cap 24 and the base cup 14 move farther apart. As the spring 44 expands, the opposition which it has been affording to its counter spring 45 is reduced, with the result that spring 45 expands, pushing the cap 40 and its lug 36 to a greater distance from the top cap 24 until said lug engages the valve stem 34 and opens the air discharge valve. The discharge valve remains open until the air pressure within has become so much reduced that the spring as a whole has contracted under the existing load to a spread in which the spring 44 so nearly balances spring 45 that with the aid of the air pressure within the chamber 23 that valve is able to close, and to lift the lug 36 as much as is needed to accomplish that. In all ordinary cases the simple action thus described is more theoretical than actual, because of the live character of the load, or because of quickly repeated and varying shocks sustained in passing over a road, and even from the oscillation of the spring itself resulting when a load is changed. This problem is somewhat difficult because the apparatus lacks human intelligence to know whether a contraction, for example, is due to addition of load or to striking an elevation in the road; and if the latter whether it will continue permanently, like an up grade, or is merely a stone in the road. The solution consists in making a distinction between permanent and temporary conditions and in providing so that the valves will not be opened by mere contraction or expansion of the spring, but only when such expansion or contraction lasts for a sufficient interval of time to be inconsistent with a temporary cause. If oscillation of the spring is occasioned by the sustaining of a compressive shock, an oscillatory expansion immediately follows which neutralizes the effect of the initial oscillatory contraction; and these in turn are followed by successive and alternate compressions and expansions. If these balance each other, and if neither alone is sufficient to move the lug 36 enough to open a valve, the spring as a whole performs its function as a normal spring without altering its stiffness. But, if the initial compression be not followed by an expansion, or if the oscillations ensue about a different center or zero point, the lug 36 will tend to be moved so as to correspond in position with the new center of oscillation. The function of the dash-pot, consisting of the piston 42 within the cup with provision for retarded flow of a liquid from one side of it to the other, is to prevent either valve 32 or 35, from being operated by mere oscillation of the spring. The dash-pot should be designed to have a sufficient slowing action to prevent one oscillation of the main spring from moving the cup 40 on its piston enough to open either valve. Assuming that the apparatus is in a normal position, with the lug 36 midway between its valve engaging positions, the balancing, or the averaging, as it were, of the oscillations, by each one more or less undoing the effect of the preceding one, produces a net result which, acting through the period of time required by the dash-pot's retarding effect, registers the average or permanent condition and at the same time automatically proceeds to correct it, if correction be needed. And this occurs, whether the spring be relatively at rest or be subject the while to most violent road shocks and oscillations.

Another important feature of the apparatus has to do with the side rods 24' and 26' and their connections, which are respectively such that when the spring is extended far enough, the top 24 becomes engaged with the sub-base 16, and the base 14 becomes engaged with the super-top 26. The spring as thus far described is so perfectly resilient owing to the almost entire absence of friction that its oscillations might extend farther than is desirable and require to be checked by a lug strap as is usual with springs under an automobile. The connection, which is thus automatically established between top and bottom when a certain degree of extension has been had, provides an elastic stop for further expansion of the spring, in that after the spring has reached the limit of extension afforded by the setting of rods 24' and 26' further separation of the axle and vehicle body can be accomplished only by compressing the spring, which thus brings that oscillation gently to an end. If desired, buffer springs or pads 24''' and 26''' may be interposed to eliminate noise when the engagement is thus made. As illustrated, the rods 26' become engaged with lugs 14' first before rods 24' engage lugs 16'. The expansion of the spring is thus stopped, and during the interval until lugs 16' become engaged the weight of the vehicle and load alone are resisting the up-throw. If this is not sufficient, the engagement of lugs 16' which ensues adds the weight of the running gear, through the main spring which intervenes and is compressed until the upward movement ceases. Thus the upward throw by oscillation of the spring is gently restrained by first cutting off the spring drive and by next employing the spring to resist the drive momentum and to give a positive retarding action. This makes it possible to serve ordinary automobile construction with an air spring considerably shorter than the telescoping principle of the main parts 12 and 22 would otherwise require. This shortening makes such springs more conveniently adaptable for specific constructions to which springs of this type have not heretofore been readily applicable. The distance and dimensions that would otherwise have to be provided for oscillation of the spring in the direction of expansion are largely saved.

While the spring or buffer herein described may be used in connection with various kinds of apparatus and may be connected thereto in numerous ways, the present drawing illustrates a device which I have found useful for connections when it is applied as a main spring under a vehicle, with the important advantages that it provides a full proportion of the available surface of a spherical bearing for sustaining vertical stresses; and that it economizes vertical space, which is limited under the body of an automobile. In such a case, it is desirable to provide a connection which permits a spring at one corner of the vehicle to be compressed or contracted regardless of the condition, at the same instant, of the springs at the three other corners of the vehicle. This requires something in the nature of a universal joint; and yet it requires strength for vertical stresses, without consuming much vertical space and it is highly desirable that a joint should be quickly separable in order to remove or replace the spring, and should be easily protectable from grit. The device illustrated is applied both at top and at bottom. The fundamental supporting elements 10 and 20 between which the spring is attached are studs having spherical heads; and their bearings consist of the two parts 10' and 16 for one, and 20' and 26 for the other. The parts 16 and 26 intervene between the studs and the spring and are in fact respectively the sub-base and super-top, herein previously mentioned. The spherical head of the stud is held against the part 16 or 26 by the yoke member 10' or 20', which may be rigidly screwed to the sub-base or super-top as indicated; and each pair is so shaped interiorly that it fits far enough around the spherical head to hold it; and not far enough to prevent the necessary amount of universal play. By merely removing the bolts, 10'', 20'' the apparatus can be taken from the vehicle. Or, without opening the bearing as that would do, the apparatus can be taken from the vehicle by merely pulling out the elements 10, 20, after unscrewing their retaining nuts.

Although the device for automatic control of the pressure within, consisting of the cup 40 and associated parts, and valves 32, and 35, are illustrated as being arranged centrally in the interior of the apparatus, which is a preferred arrangement having a number of advantages, it is not necessary that they be within it. They may be outside. The important feature in this respect is that the controller should be sensitive to the expansive and contractive movements of the apparatus, as by being connected between the top and bottom thereof, and that it should, as it responds, reach devices which open or close the appropriate valves. Nor is it necessary that the engagement of this controller with the valves be by direct, or by solely mechanical, means as here illustrated; for a direct connection and the use of means other than mechanical for actuating valves, whether those valves be set within the cap as illustrated or be conveniently located outside thereof, may be preferred under some circumstances. One utility of the inside arrangement which is illustrated is that danger of leakage incidental to the device for making the connection between the controller and the valves is eliminated, and that the only risk of leakage is such as is inherent in the valves themselves. And of that danger the apparatus is automatically corrective, for if pressure within grows too high, owing to leakage of inlet valve 32 the spring will become expanded and correction will be made by the opening of the valve 35; and the reverse is true in case of leakage of the latter valve. As the air thus flowing is automatically replaced, and can be supplied from a reservoir with air at higher pressure carried at a convenient place on the vehicle, which may be charged by a simple power-driven air pump, which latter may be one of some suitable and known automatic type, the entire system may be automatic in the sense that it maintains proper resiliency or stiffness for each spring, as predetermined, regardless of changes of load or of unevenness of load or of road. In the case of vehicles, such as trucks, which are subject to wide ranges of loading this is a matter of considerable importance as affecting their speed of operation over the road, and the wear of parts, and other operative details. Arrangement of the controller outside may be desirable when a number of individual springs are used together in a gang to act as one unit, as under a railway car. Then one controller may work a single inlet valve, for the whole unit, and a single discharge, the chambers 23 of all the individuals being connected by a continuously open passage through the cap or base of each.

The general operation of the apparatus is that the plunger 12 and casing 22 telescope in and out practically without friction and with the perfect resiliency that is characteristic of a perfect gas. The only opportunity for friction is in the rolling of the balls 17, whose friction is negligible because they merely intervene between two oppositely moving surfaces and rotate practically *in situ*, and in the bending of the septum at its moving fold 13, which requires no more power than the bending of a small and flexible piece of cloth. If desired there may be two valves 35, and two valves 32, each pair being symmetrically arranged so as to prevent any binding of the cup 40 on the piston and rod 43. To take the apparatus apart for renewing a septum or for other attention to the interior, removal of the side rods and the screws 24" that hold together the two parts of the cap 24 permits removal of the outside part of the latter, and the casing 22. The upper end of the septum 13, being flexible, can be slipped over the conical inner part of the top cap 24, because of the neck of less diameter just below it; and said cap and the interior plunger with contents are thus exposed or removed. For setting the apparatus, the annular lug 36 may be screwed up or down on the cup 40 to the desired position with respect to the two valves which it operates; preferably, however, the adjustment is accomplished by screwing the nut 44' up and down on the cup 40' to vary the place where springs 44 and 45 balance each other. The plug containing the valves 32, 33 and the plug containing the valve 35 can be removed by unscrewing from the cap 24. The lug 35 of the latter is gotten past the lug 36 by tipping the plug sidewise as it is taken out, said plug being made of two diameters, the inner and smaller of which has a screw thread engagement with the cap short enough so that when backed out it becomes clear of the screw thread before the lug 35 engages the lug 36 at the topmost position of the latter, and with room enough for these two to pass each other when tipped. The position of lug 35 on its valve stem can then be adjusted. However, openings may be provided through the cylinder 27, if desired, for access to the nut lug 35 and to the nuts 44' and 36 so that these can be adjusted without extensive removal of parts. Ordinarily these valves 33, 35 will be so designed and the lug 36 so set that there will be somewhat of a space within which the lug 36 can fluctuate in ordinary use, without opening either valve. A septum of the nature described will last for a long time; but if through any cause it is injured or gives out it can be quickly removed by the method described. The process of putting it in place involves no difficulty, it being merely necessary to rest it on the top of the tube 12 and to push the flanged ring 13' over it to fasten one end, and to slip the interior parts followed by the conical head 24 through the other end, after which the casing 22 and the outer part of the top 24 can be set around it, without disturbing the relative adjustment of the parts.

The septum is made in any suitable way; preferably it has one or more layers of flexible fabric, of cotton or the like, supporting a sheet rubber layer, the threads of the fabric being so arranged that the cotton fabric is expansible circumferentially and can lie smoothly either on the exterior of the plunger 12 or on the larger surface of the interior of the casing 22; and so that the threads do not separate enough to allow the interior coating of rubber to bulge through between any of them. The preferred weave is with tight threads one way and loose the other. Although the septum is spoken of as being of a generally cylindrical shape, its ends may be preferably formed and vulcanized in the size which they are to have when in use; and if this be done the inner end is somewhat smaller than the outer end, corresponding to the smaller diameter of the plunger which it fits.

The invention is illustrated as it may be applied to a chamber which is wholly constituted within the plunger and casing 12, 22; but it will be understood that the action would be the same if the space thus delimited were connected by an open passage through the cap 24 with a confined space outside of the parts illustrated, as has heretofore been proposed in some cases; and such other confined space might either be of fixed dimensions, or might be one or more expansible chambers.

Partly as a means of showing more clearly the principle of the arrangement illustrated in Fig. 1, a modification is illustrated in Fig. 6, in which the various parts are given the same reference numerals as elsewhere, but are arranged in a different relation to each other, the rods 24' and 26' being all in the same plane, with the latter arranged farther from the axis so as to permit this, instead of being all equidistant from the axis but in different planes as illustrated in Figs. 1 and 2.

I claim as my invention:

1. An air spring having normally closed inlet and outlet for air, and means actuated by expansion of the spring to open the outlet, and by contraction to open the inlet; and a device intervening between said means and the moving parts of the spring, actuating said means and itself being actuated with the spring actuations, and composed of means transmitting the impulses with less resilience than air.

2. An air spring, combined with means to maintain a predetermined normal degree of expansion thereof under differing loads, said spring having inlet and outlet valves for air, both of which are normally closed at said normal degree of expansion; means to actuate them, operated by the mutual approach or recession of the elements holding the air; and a retarding device less resilient than air, intervening between said elements and said actuating means, and delaying the transmission of the motion of said elements to the said actuating means.

3. An air spring having normally closed inlet and outlet for air, and means additional to the main moving members of the spring adapted automatically to open said inlet, or said outlet, for maintaining a predetermined normal degree of expansion of the spring; said additional means including a liquid and a resilient solid and being adapted to respond to change of mean degree of expansion of the spring as distinguished from responding to the elastic oscillations thereof.

4. An air spring having inlet and outlet for air, combined with a controller therefor, and a device setting the controller according to the mean degree of the expansion of the spring at the time being, as determined by the current oscillations thereof, including a liquid dash pot and a resilient connection between the liquid and the main moving members of the spring, whereby its action on the inlet and outlet is approximately independent of said oscillations.

5. An air spring having inlet and outlet for air, and a controller therefor actuated by expansion and contraction of the spring, combined with means causing the movement of said controller to lag so much behind the actuating movement of the spring as to feel the oscillation of the spring in both directions of its vibration before becoming effective to change the air inlet or outlet; the connection between said controller and the moving parts of the spring being through a resilient solid.

6. An air spring, having inlet and outlet for air through one wall of the spring, and means mounted on said wall and movable with relation thereto, by expansion and contraction of the spring, to control said inlet and outlet; its said mounting being adapted yieldingly to delay the operating movement of said controller.

7. An air spring, having inlet and outlet for air through one wall of the spring, and means mounted on the said wall and movable with relation thereto, by expansion and contraction of the spring, to control said inlet and outlet; there being springs pressing it in opposite directions, and extending to it from opposite walls, with a resultant force tending to move it to that distance from the wall on which it is mounted where the said springs shall balance each other.

8. An air spring, having inlet and outlet for air through one wall of the spring, and means mounted on said wall and movable with relation thereto, by expansion and contraction of the spring, to control said inlet and outlet; its said mounting including a dash pot.

9. An air spring, having inlet and outlet for air through one wall of the spring, and means mounted on said wall and movable with relation thereto, by expansion and contraction of the spring, to control said inlet and outlet; its said mounting including a cylindrical cup containing a liquid and a piston, the said piston being immersed in the liquid within and supporting the cup, and having a leak for the liquid past itself, whereby the operating movement of the said controlling means with respect to said wall is delayed yieldingly.

10. An air spring, having inlet and outlet for air through one wall of the spring, and means mounted on said wall and movable with relation thereto, by expansion and contraction of the spring, to control said inlet and outlet; its said mounting including a cup inside of which is a spring tending to push the cup away from said wall, and outside of which is a spring engaged with the opposite wall and tending to push the cup toward the first mentioned wall, whereby the position of said means with respect to the wall on which it is mounted depends upon the balance between the said springs engaging it.

11. An air spring, having inlet and outlet for air through one wall of the spring, and means mounted on said wall and movable with relation thereto, by expansion and contraction of the spring, to control said inlet and outlet; its said mounting including a piston projecting from said wall, a cup mounted thereon, and a spring within the cup between said piston and its bottom tending to push it from said wall; and another spring engaging the other wall of the air spring, tending to push the said cup toward the first mentioned wall; and means adapted to delay the movement of said controller with respect to the wall on which it is mounted, when said opposing springs are out of balance.

12. An air spring, having inlet and outlet for air through one wall of the spring, and means mounted on said wall and movable with relation thereto, by expansion and contraction of the spring, to control said inlet and outlet; said mounting including a cup having within it a spring tending to push the cup away from said wall and having without it a spring engaged with the opposite wall and tending to push the cup toward the first mentioned wall, whereby the position of said means with respect to the wall on which it is mounted depends upon the balance between the springs engaging it, there being a part on the cup adjustable in the direction of the action of said springs which engage it whereby the position of the cup with respect to the wall when said springs are in balance may be altered.

13. An air spring, having inlet and outlet for air through one wall of the spring; puppet valves therefor, arranged to be automatically closed by air pressure; and means mounted on said wall and movable with relation thereto by expansion and contraction of the spring, having a lug adapted to open the inlet valve when so moved by contraction, and to open the outlet valve when so moved by expansion.

14. An air spring, having inlet and outlet for air through one wall of the spring; puppet valves therefor, arranged to be automatically closed by air pressure; and means mounted on said wall and movable with relation thereto by expansion and contraction of the spring, having a lug adapted to open the inlet valve when so moved by contraction; and to open the outlet valve when so moved by expansion; there being in the inlet passage, outside of the inlet valve, an oppositely-facing check valve, preventing escape of air from the spring.

15. An air spring, having inlet and outlet valves for air through one wall of the spring, with stems projecting into the spring; a support projecting from said wall and a member movable thereon by expansion and contraction of the spring, comprising an annular lug adapted to engage the said projecting stems of valves.

16. An air spring, having inlet and outlet for air through one wall of the spring; puppet valves therefor, arranged to be automatically closed by air pressure; and means mounted on said wall and movable with relation thereto by expansion and contraction of the spring, having a lug adapted to open the inlet valve when so moved by contraction, and to open the outlet valve when so moved by expansion; the outlet valve having a stem projecting into the spring with a screw nut movable on it constituting an adjustable lug to be engaged to open the valve.

17. An air spring, having inlet and outlet for air through one wall of the spring; puppet valves therefor, arranged to be automatically closed by air pressure; and means mounted on said wall and movable with relation thereto by expansion and contraction of the spring, having a lug adapted to open the inlet valve when so moved by contraction, and to open the outlet valve when so moved by expansion; the said valves being set in passages through removable plugs in said wall.

18. An air spring comprising a chamber having a plunger and a casing with a flexible sleeve septum intervening, having its end portions flexible but inextensible rings, and fastened at one end to the plunger; there being a cap closing the casing at the other end of the septum, separable into two parts one of which comprises a disk capable of passing through the flexible septum end-ring and the other of which surrounds the disk annularly, the septum end being smaller than the adjacent part of the septum in diameter and embraced between said two parts of the cap.

19. An air spring comprising a chamber having a plunger and a casing with a flexible sleeve septum intervening, having its end portions flexible but inextensible rings, and fastened at one end to the plunger; there being a cap closing the casing at the other end of the septum, separable into two parts one of which comprises a disk capable of passing through the flexible septum end-ring and the other of which surrounds the disk annularly, the casing end and septum end being embraced between said two parts.

20. An air spring comprising a chamber having a plunger and a casing with a flexible sleeve septum intervening, having its end portions flexible but inextensible rings, and fastened at one end to the plunger; there being a cap closing the casing at the other end of the septum, separable into two parts one of which comprises a disk capable of passing through the flexible septum end-ring and the other of which surrounds the disk annularly, the septum end being smaller than the adjacent part of the septum in diameter and embraced between said two parts of the cap; there being a conical surface on one of said parts and on the septum, and one of the parts overlying the other, and the septum, whereby compression of the parts together in the direction of the axis compresses the end of the septum.

21. An air spring comprising a chamber having a plunger and a casing with a flexible sleeve septum intervening, having its end portions flexible but inextensible rings, and fastened at one end to the plunger; there being a cap closing the casing at the other end of the septum, separable into two parts one of which comprises a disk capable of passing through the flexible septum end-ring and the other of which surrounds the disk annularly, the septum end being smaller than the adjacent part of the septum in diameter and embraced between said two parts of the cap on all sides except where it is continuous with the remainder of the sleeve, and being there closely supported by said casing.

22. An air spring comprising a chamber having a tubular plunger and a casing, with a flexible sleeve septum intervening and fastened to both; the said fastening to the plunger tube comprising an end portion of the septum having a conical inextensible face toward the plunger end, and a conical end of the plunger supporting it, arranged with the pressure of air within the chamber forcing them together.

23. An air spring comprising a chamber having a tubular plunger and a casing, with a flexible sleeve septum intervening and fastened to both; the said fastening to the plunger tube comprising an end portion of the septum having a conical inextensible face toward the plunger end, and a conical end of the plunger supporting it, arranged with the pressure of air within the chamber forcing them together; with a non-drying tacky liquid intervening at said conical surface.

24. An air spring comprising a cylindrical tubular plunger and casing with intervening sleeve septum, means closing the outer ends thereof, means to maintain axial alinement, comprising an open ended cylindrical member, rigidly projecting from the closed end of the casing into and engaging the inner end of the plunger, inlet and outlet means for air, and means located within the diameter of said rigid member for opening the inlet by a contracting movement and for opening the outlet by an expansive movement.

25. An air spring comprising a cylindrical tubular plunger and casing with intervening sleeve septum, means closing the outer ends thereof, and means to maintain axial alinement, comprising an open-ended cylindrical member, rigidly projecting from the closed end of the casing into and engaging the inner end of the plunger; there being a plurality of rings of rolling bearings intervening.

26. An air spring comprising a cylindrical tubular plunger and casing with intervening sleeve septum, means closing the outer ends thereof, means to maintain axial alinement, comprising an open-ended cylindrical member, rigidly projecting from the closed end of the casing into and engaging the inner end of the plunger; there being intervening a cage comprising two concentric cylinders of sheet metal with a multiplicity of balls sustained loosely in fixed positions therein, engaging the interior of the plunger and the exterior of said rigid cylindrical member.

27. An air spring comprising a cylindrical tubular plunger and casing with intervening sleeve septum, means closing the outer ends thereof, means to maintain axial alinement, comprising an open-ended cylindrical member, rigidly projecting from the closed end of the casing into and engaging the inner end of the plunger; there being intervening a cage comprising two concentric cylinders of sheet metal with a multiplicity of balls sustained loosely in fixed positions therein, engaging the interior of the plunger and the exterior of said rigid cylindrical member; and having a porous material adapted to hold lubricant.

28. An air spring comprising a cylindrical tubular plunger and casing with intervening sleeve septum, means closing the outer ends thereof, means to maintain axial alinement, comprising an open-ended cylindrical member, rigidly projecting from the closed end of the casing into and engaging the inner end of the plunger; an annular anti-friction device through which said engagement occurs; and equal springs intervening between said device and the opposite ends of the air spring, whereby said device is maintained in medial position between said opposite ends.

29. An air spring comprising a cylindrical tubular plunger and casing with intervening sleeve septum, means closing the outer ends thereof, means to maintain axial alinement, comprising an open-ended cylindrical member, rigidly projecting from the closed end of the casing into and engaging the inner end of the plunger; an anti-friction element intervening, and means maintaining it equidistant from the ends of the air spring during contractions and expansions thereof.

30. An air spring comprising a cylindrical tubular plunger and casing with intervening sleeve septum, means closing the outer ends thereof, means to maintain axial alinement, comprising an open-ended cylindrical member, rigidly projecting from the closed end of the casing into and engaging the inner end of the plunger; an anti-friction element intervening, and supporting springs therefor counterbalancing each other when it is in the middle between the ends.

31. An air spring, comprising telescoping members, having its support at one end separable into outer and inner parts, the outer part of which constitutes attaching means for that end of the spring; and connecting means from the inner part to the other end of the spring, having lost motion during the normal working range of the spring and becoming engaged at the limit thereof, thereby permitting further separation of the said outer part from the other end of the spring without further expansion of the spring; there being on one of the separated parts a stub, and on the other a cup adapted to receive it, whereby the parts come back into registry together after separation.

32. An air spring comprising a cylindrical tubular plunger and casing with intervening sleeve septum, means closing the outer ends thereof, means to maintain axial alinement, comprising an open-ended cylindrical member, rigidly projecting from the closed end of the casing into and engaging the inner end of the plunger; and an intervening cage comprising two concentric cylinders of sheet metal with concave tongues stamped and bent at right angles to sustain balls and a multiplicity of balls sustained loosely by these concave portions, engaging the interior of the plunger and the exterior of said rigid cylindrical member; and a porous material between the metal sheets, adapted to hold lubricant.

33. An air spring, comprising cylinders, telescoping together, combined with a flexible and everted sleeve septum intervening between said telescoping members; and a multiplicity of rolling incompressible members constituting bearings holding the telescoping members in coaxial relation.

34. An air spring comprising a chamber having a plunger and a casing, with a flexible sleeve septum intervening and having its end portions fitting against larger portions of the plunger and casing respectively; the septum being circumferentially inherently extensible in its body portion and inextensible in its end portions.

35. An air spring comprising a chamber having a plunger and a casing, with a flexible sleeve septum intervening, and having its end portions fitting against larger portions of the plunger and casing respectively; the septum being circumferentially inherently extensible in its body portion and inextensible but collapsible in its end portions.

36. An air spring comprising a chamber having a plunger and a casing, with a flexible sleeve septum intervening, having its end portions with conical faces adapted to fit against and incase conical faces of the plunger and casing respectively; the said end portions being inherently inextensible to size larger than the said plunger and casing parts against which they fit, and being arranged for the pressure of air within the spring to tend toward making the fit tight.

Signed at Barrington this twenty-fourth day of June, 1918.

ALEXANDER P. BOURNE.